(12) United States Patent  
Jiang et al.

(10) Patent No.: US 12,481,003 B2
(45) Date of Patent: Nov. 25, 2025

(54) VEHICLE BATTERY HEALTH DIAGNOSTICS BY ELECTRODE POTENTIAL ESTIMATION

(71) Applicant: GM GLOBAL TECHNOLOGY OPERATIONS LLC, Detroit, MI (US)

(72) Inventors: Shengbing Jiang, Rochester Hills, MI (US); Xinyu Du, Oakland Township, MI (US); Rasoul Salehi, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 138 days.

(21) Appl. No.: 18/425,444

(22) Filed: Jan. 29, 2024

(65) Prior Publication Data

US 2025/0244396 A1    Jul. 31, 2025

(51) Int. Cl.
*G01R 31/392* (2019.01)
*G01R 31/367* (2019.01)
*H01M 10/0525* (2010.01)
*H01M 50/249* (2021.01)

(52) U.S. Cl.
CPC ......... *G01R 31/392* (2019.01); *G01R 31/367* (2019.01); *H01M 10/0525* (2013.01); *H01M 50/249* (2021.01); *H01M 2220/20* (2013.01)

(58) Field of Classification Search
None
See application file for complete search history.

(56) References Cited

U.S. PATENT DOCUMENTS

2010/0026240 A1*  2/2010  Jiang ................. H01M 10/4235
                                                              320/116

* cited by examiner

*Primary Examiner* — Jas A Sanghera
(74) *Attorney, Agent, or Firm* — Quinn IP Law (57) ABSTRACT

A system and method for diagnosing vehicle battery health using electrode potential estimation is presented. A first set of anode electrode potentials and a first set of cathode electrode potentials of a pristine vehicle battery cell are determined at a first charge rate. A second set of anode electrode potentials and a second set of cathode electrode potentials of a pristine vehicle battery cell are determined at a second charge rate. A determination of a set of optimized health indicators are made based on the first set of anode electrode potentials, the first set of cathode electrode potentials, the second set of anode electrode potentials, and the second set of cathode electrode potentials. Testing a vehicle battery is administered, based on the optimized health indicators, after a first number of cycles to determine a faulty one or more cells of the vehicle battery.

20 Claims, 8 Drawing Sheets

VEHICLE BATTERY HEALTH DIAGNOSTICS BY ELECTRODE POTENTIAL ESTIMATION

Vehicles are rapidly integrating ever increasing technological components into their systems, especially in the direction of hybrid electric and battery based electric vehicles (EVs). EVs are becoming increasingly popular as an environmentally friendly alternative to traditional gasoline-powered vehicles. However, one of the challenges associated with EVs is the need for reliable and healthy battery systems.

The ability to perform early diagnostics and address battery cell shortcomings within a vehicle's battery system may avoid future performance and reliability problems. Early battery testing and diagnostics at the manufacturing plant and/or during the early period of operation may allow for remedial actions to avoid future issues. In addition, early diagnostics may provide information for control and manufacturing improvements.

SUMMARY

Disclosed herein are a system and method for diagnosing vehicle battery health using electrode potential estimation. Through testing, for example in a laboratory, of pristine battery cells, e.g., known good cells, electrode potential (EP) curves may be generated at different charge rates, e.g., C-rates. Pristine may be defined as a battery cell with defects below a predetermined threshold, or in other words a battery cell with performance greater than a predetermined threshold. The charge and discharge rates of a battery may be governed by a C-rate. For example, a battery with a capacity rated at 1C may mean that a fully charged battery rated at 1 Ah should provide 1A for one hour. The same battery discharging at 0.5C, or C/2) may provide 500 ma for two hours, and at 2C may deliver 2A for 30 minutes. In a similar manner a C/100 rate may indicate a low charge/discharge rate with a 100-hour capacity versus a C/3 rate that may indicate a typical vehicle battery charge/discharge rate with a three-hour capacity.

EP curves for different C-rates may be derived by experimentation with pristine cells to generate an optimal EP set of curves for possible cycle scenarios. This set of EP curves may then be compared to EP curves for a vehicle battery to diagnose discrepancies within the vehicle battery that may be further diagnosed and corrected.

Thus, this disclosure will present new methods to estimate anode/cathode potentials by using EP curves for pristine cells at different C-rates and then by using constant current (CC) charging or discharging data may estimate the anode/cathode potentials. Further, instead of using CC charging data, estimated open circuit voltage value data may also be used to estimate the anode/cathode potentials as will be discussed.

Thus, a method for diagnosing vehicle battery health using electrode potential estimation may include determining, by experimentation, for a pristine vehicle battery cell, a first set of anode electrode potentials and a first set of cathode electrode potentials for the pristine vehicle battery cell at a first charge rate (C-rate). The diagnosing may continue with a determining, by experimentation, for the vehicle battery cell, a second set of anode electrode potentials and a second set of cathode electrode potentials for the pristine vehicle battery cell at a second charge rate (C-rate). Further, the diagnosing may include a determining a set of optimized health indicators based on the first set of anode electrode potentials and the first set of cathode electrode potentials and the second set of anode electrode potentials and the second set of cathode electrode potentials and then applying the optimized health indicators to a vehicle battery after a first number of cycles. Based on applying the optimized health indicators, a determination may be made of the existence of one or more faulty cells of the vehicle battery.

Another aspect of the method may include that the pristine vehicle battery cell is of a lithium-ion type.

Another aspect of the method may include that the second charge rate (C-rate) is greater than C/100, where C represents the capacity of a vehicle battery measured in amp hours.

Another aspect of the method may further include identifying an appropriate range for the health indicators.

Another aspect of the method may include determining that the set of optimized health indicators includes measuring a plurality of cell voltages and a plurality of current values at a constant current charging or discharging of the pristine vehicle battery cell.

Another aspect of the method may include determining that the set of optimized health indicators is based on solving the optimization problem minimizing the health indicators where $$\min_\theta \sum_k \left( [V_{k+1} - V_k] - \left( [q_{ca}^{-1}(Q_{k+1}/C_N) - q_{ca}^{-1}(Q_k/C_N)] - [q_{an}^{-1}(Q_{k+1}/C_N) - q_{an}^{-1}(Q_k/C_N)] \right) \right)^2,$$

where $Q_k = I*k*\Delta t$ is the amount of charge or discharge of the battery cell up to time $k*\Delta t$; $C_N$ is the nominal capacity of the battery cell; I is the current; and $\Delta t$ is a sampling period. $q_{ca}^{-1}$ and $q_{an}^{-1}$ are the inverse functions of $q_{ca}$ and $q_{an}$, which are described below.

Another aspect of the method may include where the determining the set of optimized health indicators is based on:

$$\frac{Q}{C_N} = q_{an}(EP_{an}) = a * g_{an}^{\frac{C}{j}}(EP_{an}) + b * g_{an}^{\frac{C}{k}}(EP_{an}) + c$$

$$\frac{Q}{C_N} = q_{ca}(EP_{ca}) = d * g_{ca}^{\frac{C}{j}}(EP_{ca}) + e * g_{ca}^{\frac{C}{k}}(EP_{ca}) + f$$

where a, b, c, d, e, and f represent health indicator values; $C_N$ is the nominal capacity of the battery cell;

$$g_{an}^{\frac{C}{j}} \text{ and } g_{an}^{\frac{C}{k}}$$

are the charge to anode potential functions at C-rates of $$\frac{C}{j} \text{ and } \frac{C}{k}; g_{ca}^{\frac{C}{j}} \text{ and } g_{ca}^{\frac{C}{k}}$$

are the charge to cathode potential functions at C-rates of $$\frac{C}{j} \text{ and } \frac{C}{k} \cdot g_{an}^{\frac{C}{j}} \text{ and } g_{an}^{\frac{C}{k}}, \text{ and } g_{ca}^{\frac{C}{j}} \text{ and } g_{ca}^{\frac{C}{k}}$$

may be determined from the experimental measurements.

Another aspect of the method may include determining the set of optimized health indicators includes measuring a plurality of cell open circuit voltages (OCV) and a plurality of current values at a constant rate of discharging of the pristine vehicle battery cell.

Another aspect of the method may include determining the set of optimized health indicators based on solving the optimization problem:

$$\min_\theta \sum_k [OCV_k - (q_{ca}^{-1}(Q_k/C_N) - q_{an}^{-1}(Q_k/C_N))]^2$$

where $Q_k = Q_{k-1} + I_k * \Delta t$;
$Q_0 = SOC_0 * C_N$ with $C_N$ representing the nominal capacity of the pristine vehicle battery cell.

Another aspect of the disclosure may include a system for diagnosing vehicle battery health using electrode potential estimation includes a computer to determine, for a pristine vehicle battery cell, a first set of anode electrode potentials and a first set of cathode electrode potentials for the vehicle battery cell at a first charge rate. The computer may also determine, for the pristine vehicle battery cell, a second set of anode electrode potentials and a second set of cathode electrode potentials for the pristine vehicle battery cell at a second charge rate. Further, a computer, may determine a set of optimized health indicators based on the first set of anode electrode potentials and the first set of cathode electrode potentials and the second set of anode electrode potentials and the second set of cathode electrode potentials. In addition, a battery testing system may be used to test a vehicle battery after a first number of cycles using the optimized health indicators and to determine, based on the applied optimized health indicators, a faulty one or more cells of the vehicle battery.

Another aspect of the disclosure may include that the pristine vehicle battery cell is of a lithium-ion type.

Another aspect of the disclosure may include that the second charge rate (C-rate) is greater than C/100, where C represents the capacity of a vehicle battery measured in amp hours.

Another aspect of the disclosure may include that the computer may identify an appropriate range for the health indicators.

Another aspect of the disclosure may include that the computer may determine the set of optimized health indicators may include measuring a plurality of cell voltages and a plurality of current values at a constant current charging or discharging of the pristine vehicle battery cell. Another aspect of the disclosure may include that the computer may determine the set of optimized health indicators based on solving the optimization problem:

$$\min_\theta \sum_k ([V_{k+1} - V_k] - ([q_{ca}^{-1}(Q_{k+1}/C_N) - q_{ca}^{-1}(Q_k/C_N)] - [q_{an}^{-1}(Q_{k+1}/C_N) - q_{an}^{-1}(Q_k/C_N)]))^2$$

where $Q_k = I * k * \Delta t$ and $\Delta t$ is a sampling period

Another aspect of the disclosure may include that the computer may determine the set of optimized health indicators based on $$\frac{Q}{C_N} = q_{an}(EP_{an}) = a * g_{an}^{\frac{C}{j}}(EP_{an}) + b * g_{an}^{\frac{C}{k}}(EP_{an}) + c$$

-continued $$\frac{Q}{C_N} = q_{ca}(EP_{ca}) = d * g_{ca}^{\frac{C}{j}}(EP_{ca}) + e * g_{ca}^{\frac{C}{k}}(EP_{ca}) + f$$

where a, b, c, d, e and f represent health indicator values.

Another aspect of the disclosure may include that the computer may determine the set of optimized health indicators may include measuring a plurality of cell open circuit voltages (OCV) and a plurality of current values at a constant rate of discharging of the pristine vehicle battery cell.

Another aspect of the disclosure may include that the computer, in determining the set of optimized health indicators, is based on solving the optimization problem:

$$\min_\theta \sum_k ([OCV_k - (q_{ca}^{-1}(Q_k/C_N) - q_{an}^{-1}(Q_k/C_N))])^2,$$

where $Q_k = Q_{k-1} + I_k * \Delta t$;
$Q_0 = SOC_0 * C_N$ with $C_N$ representing the nominal capacity of the pristine vehicle battery cell.

Another aspect of the disclosure may include a method for diagnosing vehicle battery health using electrode potential estimation that includes determining, for a pristine lithium-ion vehicle battery cell, a first set of anode electrode potentials and a first set of cathode electrode potentials for the pristine lithium-ion vehicle battery cell at a first charge rate. The method may further include determining, for the pristine lithium-ion vehicle battery cell, a second set of anode electrode potentials and a second set of cathode electrode potentials for the pristine lithium-ion vehicle battery cell at a second charge rate, where the second charge rate (C-rate) is greater than C/100, and where C represents a capacity of a vehicle battery measured in amp hours. Further, determining a set of optimized health indicators may be based on the first set of anode electrode potentials and the first set of cathode electrode potentials and the second set of anode electrode potentials and the second set of cathode electrode potentials. An identifying an appropriate range for the health indicators may be by applying the optimized health indicators to a vehicle battery after a first number of cycles and determining, based on the applied optimized health indicators, a faulty one or more cells of the vehicle battery.

Another aspect of the method may include where the determining the set of optimized health indicators comprises measuring a plurality of cell voltages and a plurality of current values at a constant current charging or discharging of the pristine vehicle battery cell.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Figure 1:
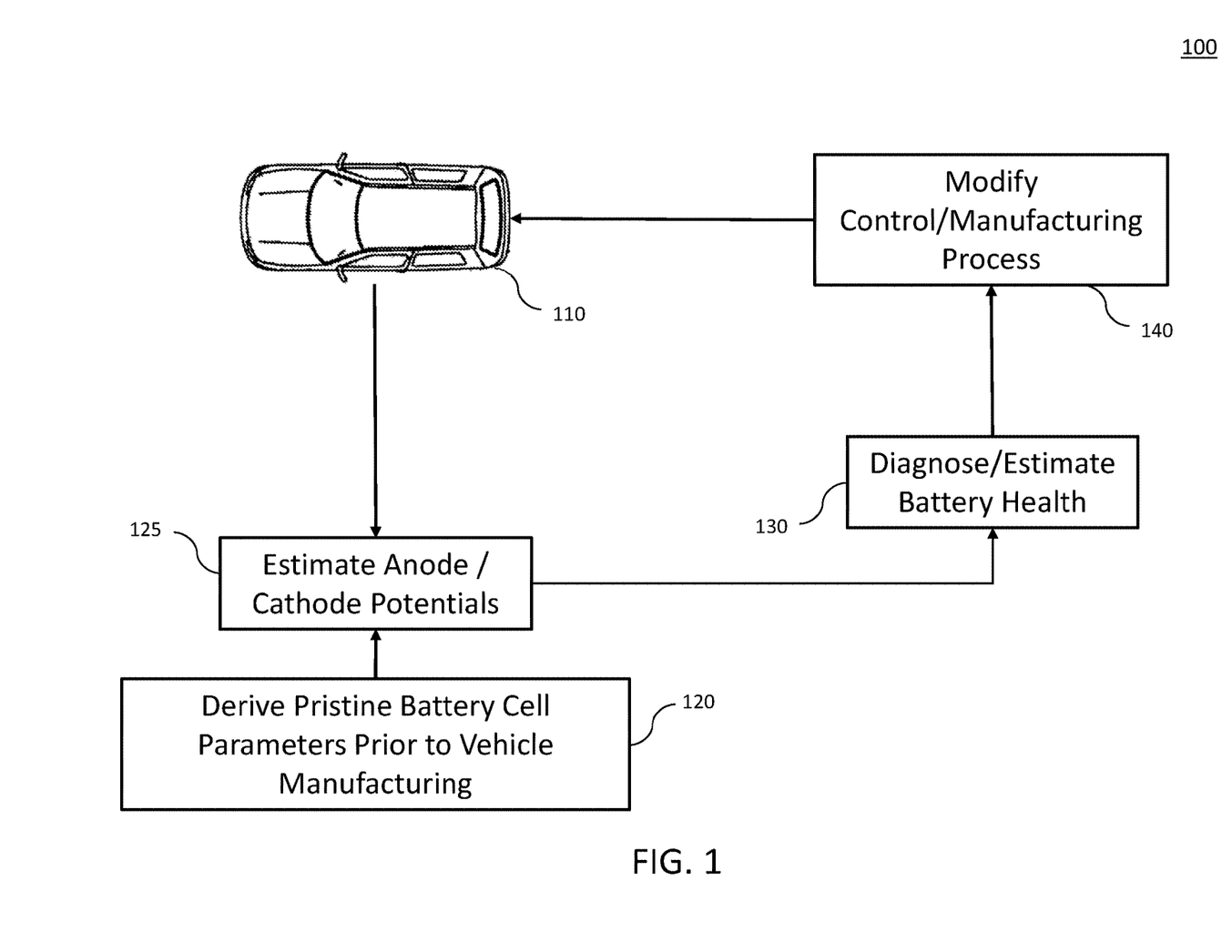
FIG. 1 is an illustration of a process to diagnose vehicle battery health using electrode potential estimation, in accordance with the disclosure.

FIG. 1 illustrates a process 100 to diagnose vehicle battery health using electrode potential estimation, according to an embodiment of the present disclosure. Electric vehicle 110 may be an electric vehicle or a hybrid model, or another design. Electric vehicle 110 may contain a vehicle battery that includes multiple battery cells. However, vehicle batteries may include cells that may be damaged or defective. Damaged or defective vehicle battery cells may degrade their ability to hold a charge or may lead to additional complications. Thus, it is desirable to be able to detect, diagnose, and address vehicle battery issues.

Electric vehicle 110 may generate multiple data points at a particular time for its vehicle battery cells, for example, voltage, charge capacity, current draw, temperature, etc. Such data points, combined with pristine battery cell parameters 120 may be used to estimate anode and cathode potentials at 125 and generate a set of health indicators, as will be discussed in greater detail. Pristine battery cell parameters 120 may be derived in an experimental or laboratory environments and represent the ideal or perfect vehicle battery parameters.

At 130 the estimated anode and cathode potentials, or electrode potential (EP) curves may be compared to the actual EP curves of a particular vehicle's battery cells to diagnose and estimate a battery cell health. Based on such analysis, at 140, modification of control processes or manufacturing processes may be implemented to improve vehicle battery diagnostics and potential fixes.

Figure 2:
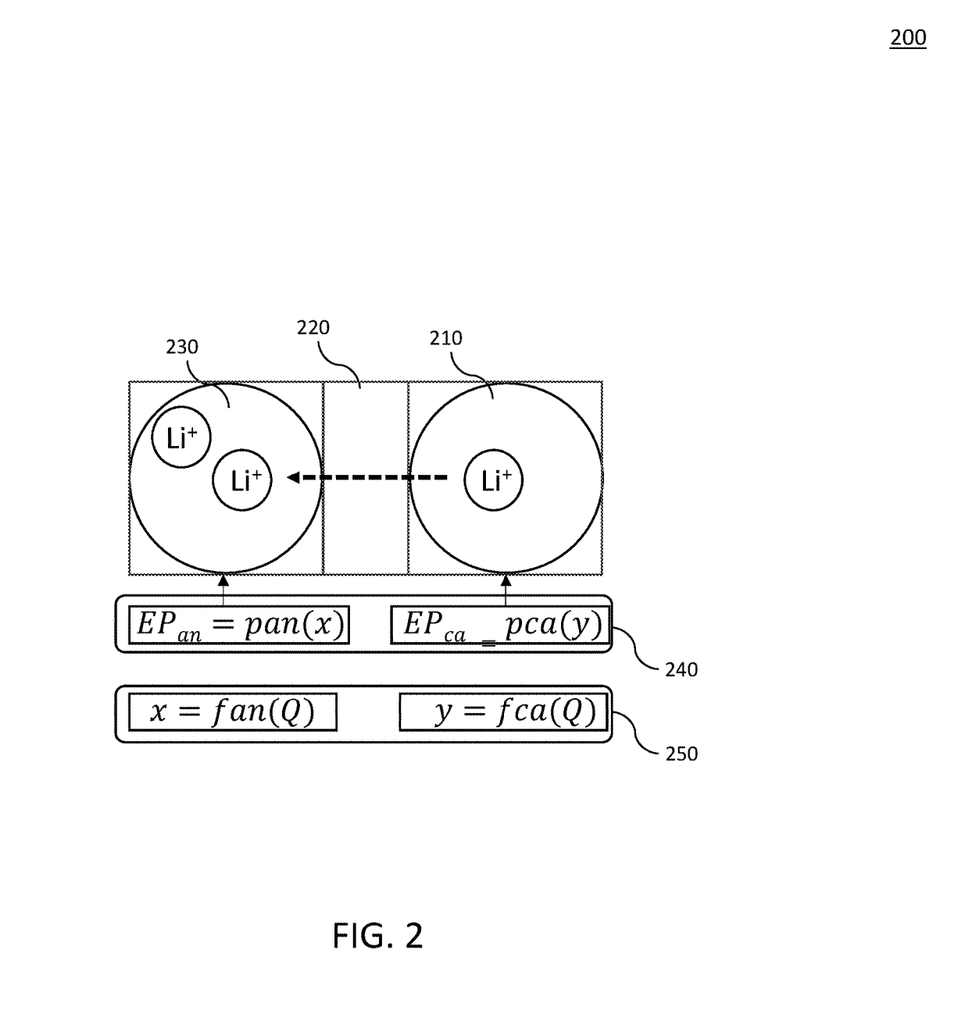
FIG. 2 is an illustration of a vehicle battery cell and associated characteristics, in accordance with the disclosure.

FIG. 2 is an illustration of a vehicle battery cell 200 and associated characteristics, according to an embodiment of the present disclosure. Vehicle battery cell 200 may include a cathode 210, a separator 220, and an anode 230. Vehicle battery cell 200 illustrates the flow of lithium ions, as shown here in a lithium-ion cell, where the lithium ions may flow from cathode 210 through separator 220 to anode 230 during charging and in the opposite direction during a discharging cycle. Separator 220 may be a thin, porous membrane that physically separates the anode and cathode to prevent physical contact between the anode 230 and cathode 210, while facilitating ion transport.

As shown in 240, the electrode potential of the anode, EP, and the electrode potential of the cathode, EP, may be determined by the electrode chemistries of the battery cell. Further, x/y may represent a normalized lithium surface density at the anode/cathode. The difference between EP and EP may also be referred to as the open circuit voltage, OCV, of the cell, i.e., OCV=EP−EP. Further, the OCV may be a function of the charge of the cell and referred to as Q.

In addition, as will be shown in FIG. 3, the electrode potential at the cathode and anode may be graphed as their potential versus the battery cell's state of charge, SOC, which may be referred to as EP curves, according to an embodiment of the present disclosure. As will be shown, the EP curves disclose a nonlinear result from cell charge Q to the normalized lithium surface density x/y at the anode/cathode, except at low charge rates, e.g., c-rates of C/100. However, electric vehicle charge-rates may typically occur at higher charge rates, e.g., C/3-C/5. As depicted in 250, equations for the EP curves where the EP of the anode is a function of the charge capacity Q and represented as x, and where the EP of the cathode is also a function of the charge capacity Q and represented as y.

Figure 3A:
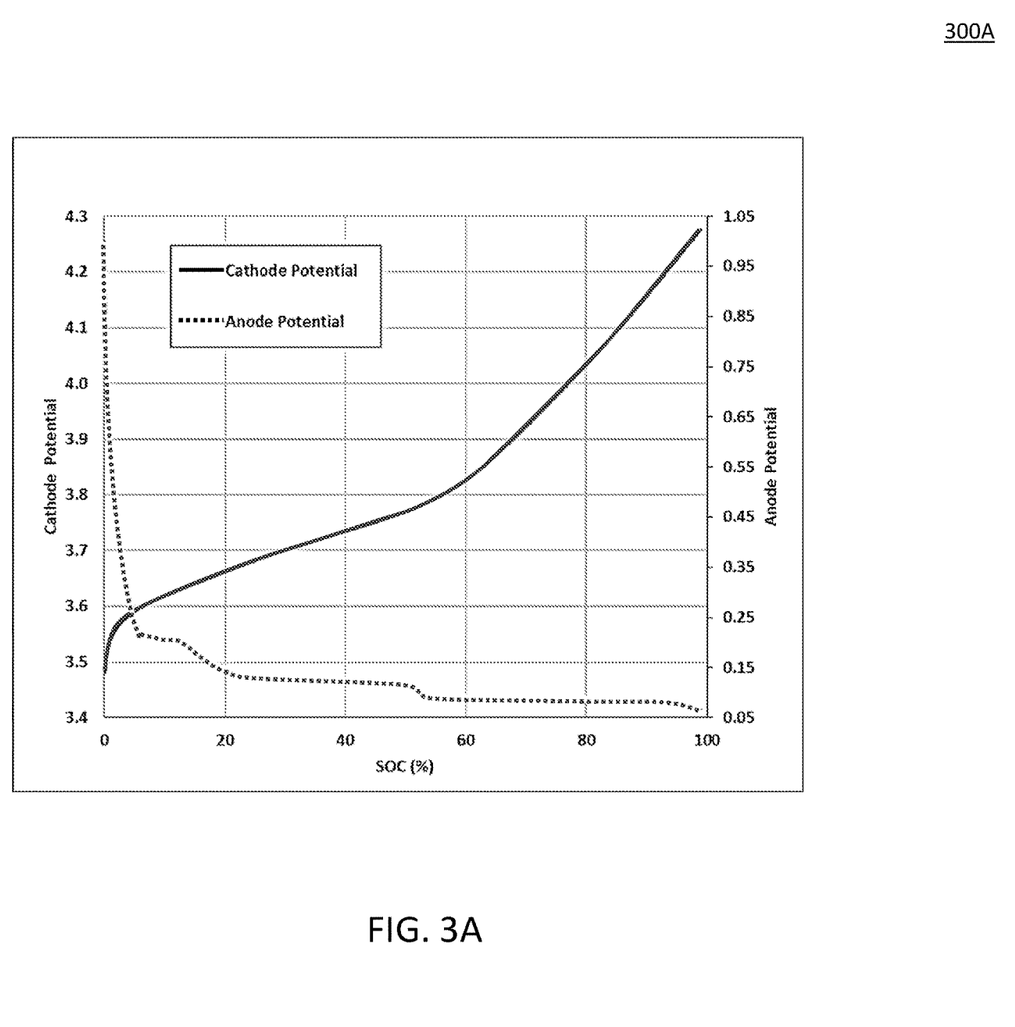
FIGS. 3A, 3B, and 3C illustrate electrode potential (EP) curves representing multiple charge rates, in accordance with the disclosure.
Figure 3B:
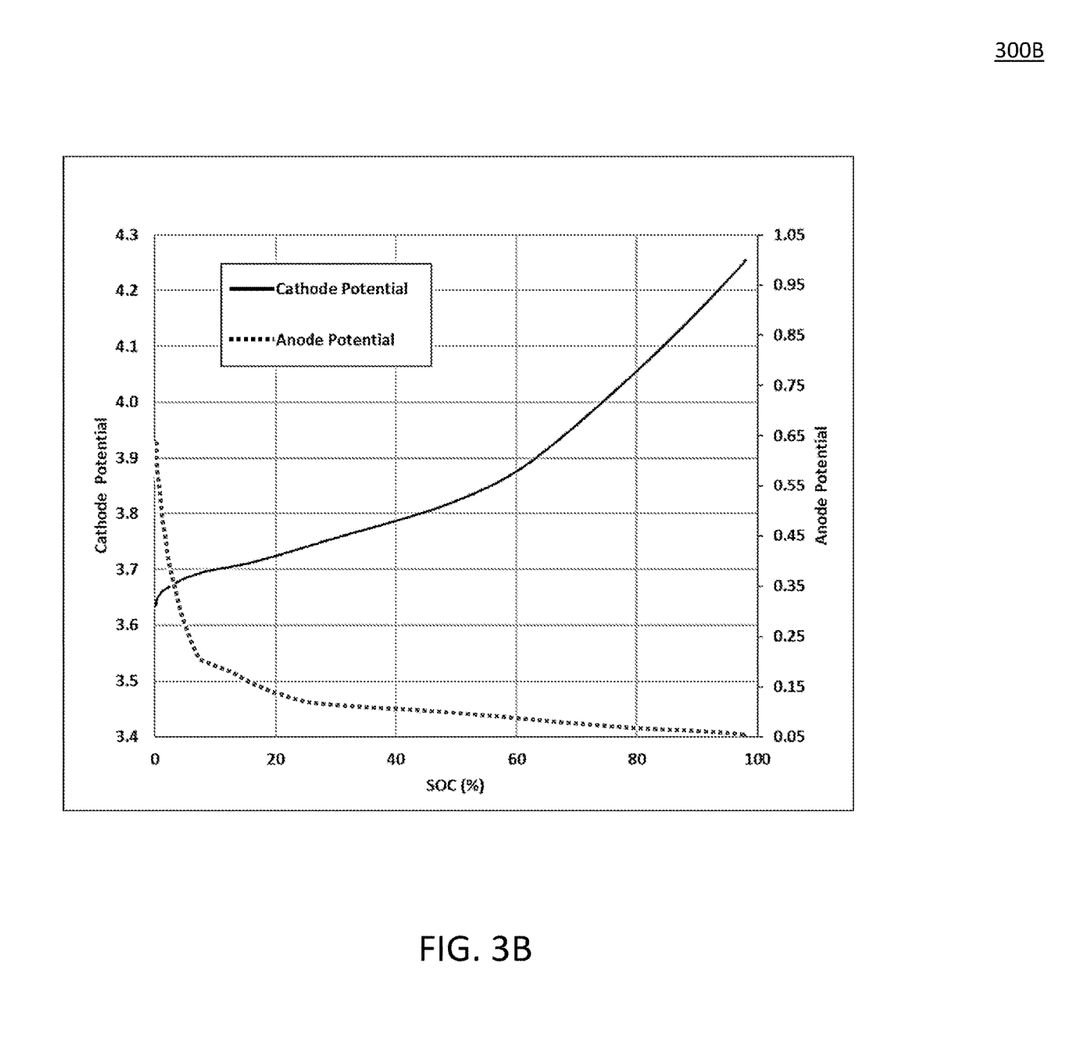

FIG. 3A and FIG. 3B represent EP curve 300A and EP curve 300B, respectively, for pristine battery cells at different charge rates. For example, EP curve 300A is an example of EP curves at a charge rate of C/100. EP curve 300B is an example of EP curves at a charge rate of C/5. Given EP curve 300A and EP curve 300B at different charge rates, a resultant set of EP curves for a vehicle battery at a particular age, e.g., number of charging/discharging cycles, may be determined. Such a result is shown as EP curve 300C in FIG. 3C.

Figure 3C:
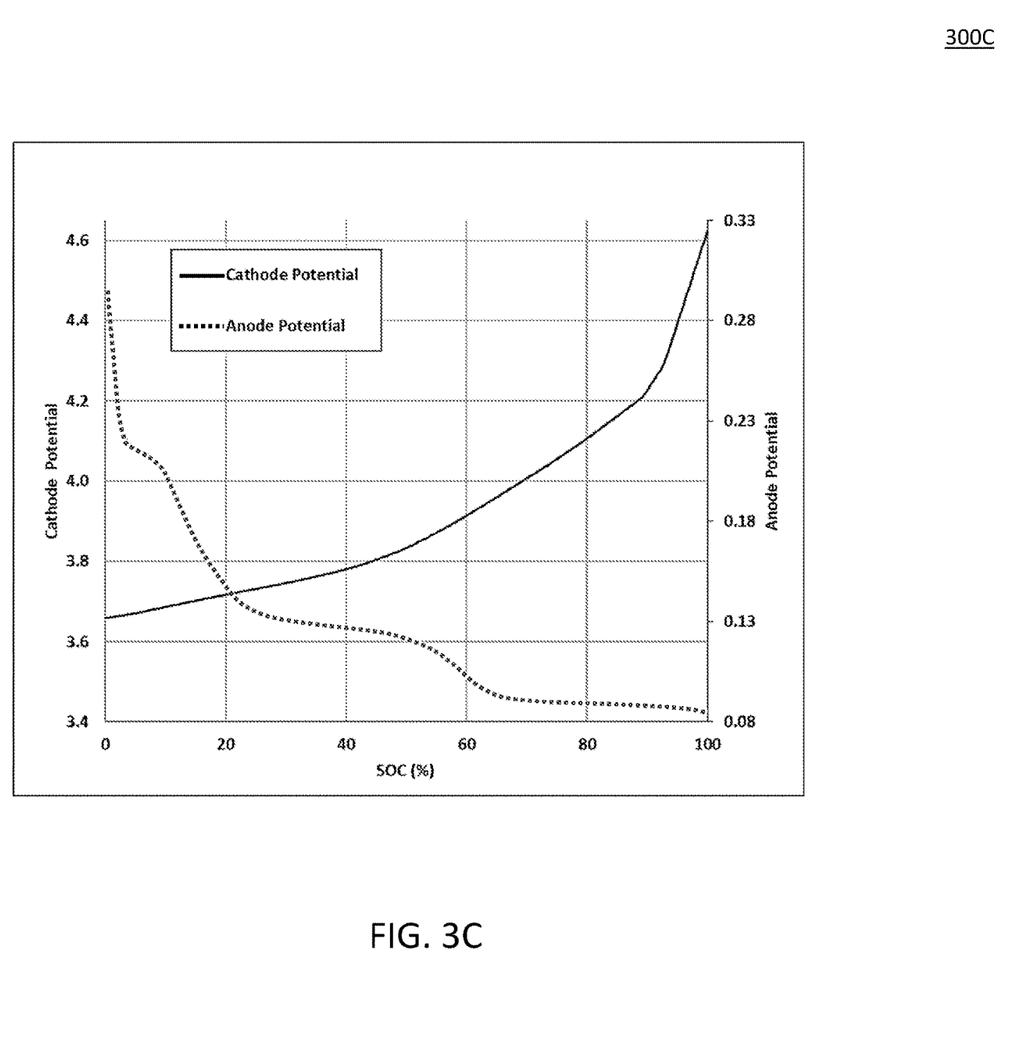

EP curve 300C may be determined by using as inputs the anode and cathode EP v. state of charge (SOC) curves at two different C-rates. In the example of EP curve 300A and EP curve 300B those rates were 5 and 100. The curves may also be expressed as:

{soc=$g_{an}^{c/j}$(EP$_{an}$), SOC=$g_{an}^{c/k}$(EP$_{an}$), soc=$g_{ca}^{c/j}$(EP$_{ca}$), soc=$g_{ca}^{c/k}$(EP$_{ca}$)}, for pristine cells, where in this example j=5 and k=100. C may be described as the capacity of the cell; EP is the electrode potential at the anode; EP is the electrode potential at the cathode, and g is the function from EP$_{an}$ to the state of charge (SOC) at the anode, and g is the function from EP$_{ca}$ to the state of charge (SOC) at the cathode. There may also be a nominal capacity $C_N$ between {$V_{low}$, $V_{high}$} and time series data {$V_k$, $I_k$} of the cell between {$V_{high}$, $V_{low}$} at constant current charging or discharging where V may represent voltage, and I may represent current.

EP curve 300C may be represented using the functions Q/$C_N$=(EP) and Q/$C_N$=(EP) with characterization parameters than may serve as health indicators. This may be represented as follows with health indicators shown as θ={a, b, c, d, e, f}:

$$Q/C_N = q_{an}(EP_{an}) = a * g_{an}^{\frac{C}{j}}(EP_{an}) + b * g_{an}^{\frac{C}{k}}(EP_{an}) + c$$

$$Q/C_N = q_{ca}(EP_{ca}) = d * g_{ca}^{\frac{C}{j}}(EP_{ca}) + e * g_{ca}^{\frac{C}{k}}(EP_{ca}) + f$$

Health indicators θ={a, b, c, d, e, f} may be estimated by the voltage and current of a vehicle battery cell. This may be accomplished in two manners. The first approach may be to use cell voltage and current values {$V_k$, I} at constant current (CC) charging or discharging. The second approach may be to use an estimated open circuit voltage, OCV$_k$ and the associated current $I_k$ while discharging a cell.

The constant current while charging uses the following expression to generate the EP curve, for example as illustrated in EP curve 300C:

$$\min_\theta \sum_k ([V_{k+1} - V_k] - ([q_{ca}^{-1}(Q_{k+1}/C_N) - q_{ca}^{-1}(Q_k/C_N)] - [q_{an}^{-1}(Q_{k+1}/C_N) - q_{an}^{-1}(Q_k/C_N)]))^2$$

where $Q_k$=I*k*Δt and Δt is a sampling period.

The above equation is further supported by the reasoning that at constant current charging or discharging:

$$V = OCV + I*R;$$

$$V_{k+1} - V_k \cong OCV_{k+1} - OCV_k \text{ Note: } OCV = EP_{ca} - EP_{an}$$

Figure 4:
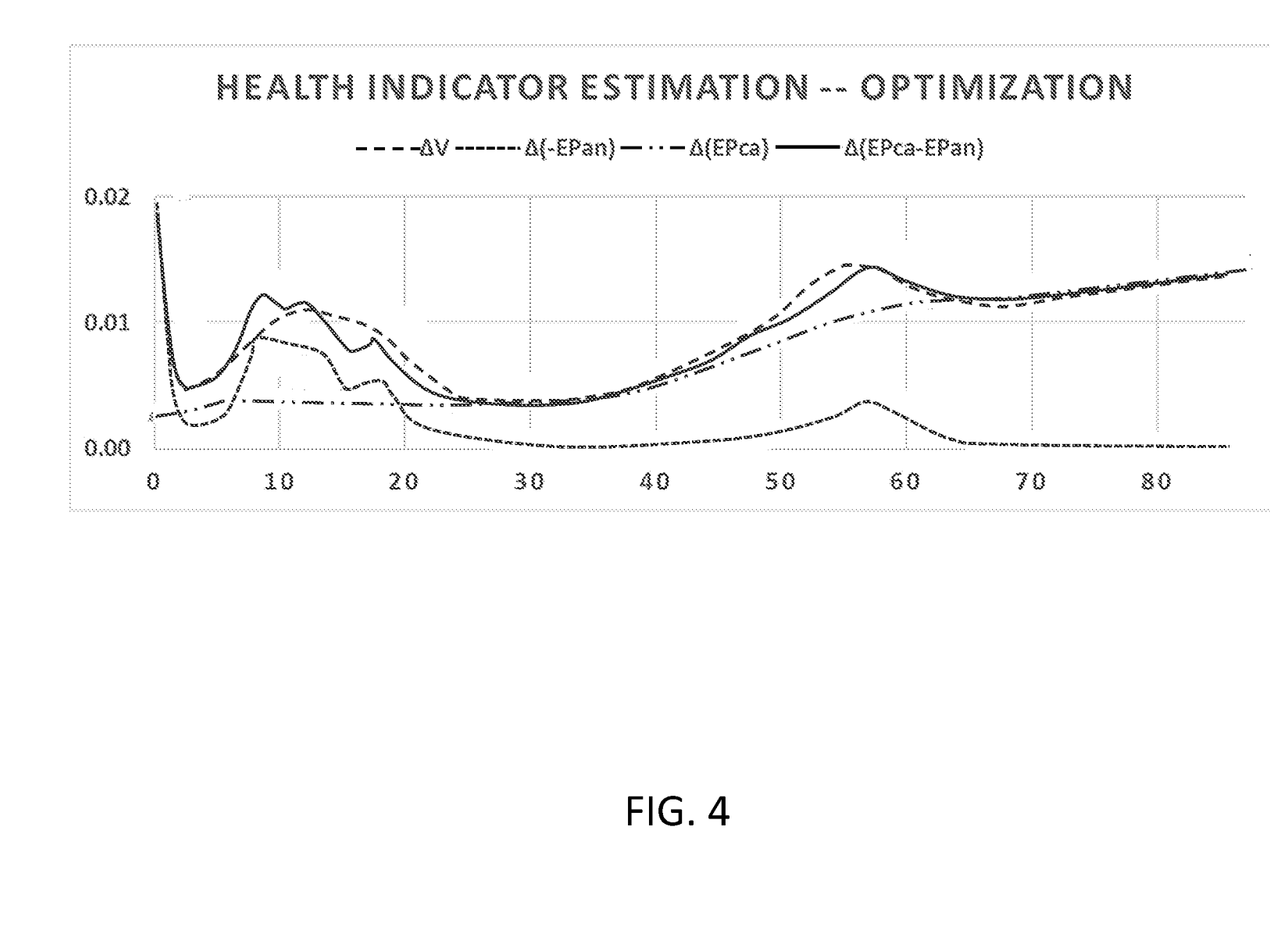
FIG. 4 is an illustration of an optimization of battery cell health indicators, in accordance with the disclosure.

By minimizing θ={a, b, c, d, e, f} in the above equation, EP curve 300C may be produced, in this example a=0.78; b=0.47, c=−0.07, d=0.37, e=0.8, and f=0.21. This solution may also be shown as FIG. 4 with the vertical axis showing dV/dQ or dV/dSOC and the horizontal axis representing the state of charge (SOC) of a cell, according to an embodiment of the present disclosure.

As mentioned above, health indicators θ={a, b, c, d, e, f} may also be estimated by the use of an estimated open circuit voltage, OCV and the associated current $I_k$ while discharging a cell. At discharge the health indicators may be determined as follows based on the estimated OCV$_k$ and the associated current $I_k$:

$$\min_\theta \sum_k ([OCV_k - (q_{ca}^{-1}(Q_k) - q_{an}^{-1}(Q_k))]^2, \text{ where } Q_k = Q_{k-1} + I_k * \Delta t;$$

$Q_0$=SOC$_0$*$C_N$ with $C_N$ representing the nominal capacity of the pristine vehicle battery cell.

In addition, for the scenario of constant current charging or discharging, the procedure for estimating the health indicators may also include the following steps. First, identify appropriate ranges for θ={a, b, c, d, e, f} as constraints. Second, to generate appropriate initial values for θ={a, b, c, d, e, f}. Third, to preprocess and/or smooth and select the input data {$V_k$, $Q_k$}. Fourth, solve the optimization to derive θ, for example, $$\min_\theta \sum_k ([V_{k+1} - V_k] - ([q_{ca}^{-1}(Q_{k+1}/C_N) - q_{ca}^{-1}(Q_k/C_N)] - [q_{an}^{-1}(Q_{k+1}/C_N) - q_{an}^{-1}(Q_k/C_N)]))$$

In addition, for the scenario of discharging, the procedure for estimating the health indicators may also include the following steps. First, identify appropriate ranges for θ={a, b, c, d, e, f} as constraints. Second, to generate appropriate initial values for θ={a, b, c, d, e, f}. Third, to preprocess and/or smooth and select the input data {$V_k$, $I_k$}. Fourth, solve the optimization to derive θ, for example, $$\min_\theta \sum_k ([OCV_k - (q_{ca}^{-1}(Q_k/C_N) - q_{an}^{-1}(Q_k/C_N))]^2,$$

$$\text{where } Q_k = Q_{k-1} + I_k * \Delta t;$$

$$Q_0 = 0.$$

FIG. 5 is an example of the health indicators θ={a, b, c, d, e, f} of a vehicle battery with twelve cells at various levels of being charged and discharged, i.e., a cycle, according to an embodiment of the present disclosure. As previously discussed, a battery may show decreased or complete failure if the separator between the anode and cathode becomes compromised. FIGS. 5A, 5B, 5C, and 5D represent the health indicators of a vehicle battery after 2, 50, 100, and 200 cycles where the triangle icon represents cells with no induced failure, the square icon represents cells with three holes cut into the separators, and the circle icon represent cells with slices introduced into the cell separators.

Figure 5A:
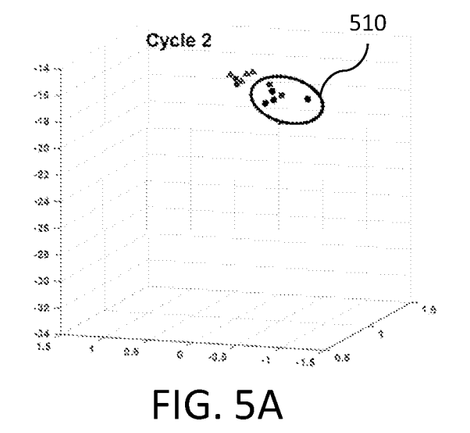
FIGS. 5A, 5B, 5C, and 5D illustrate detection of damaged cells from separator health, in accordance with the disclosure.
Figure 5B:
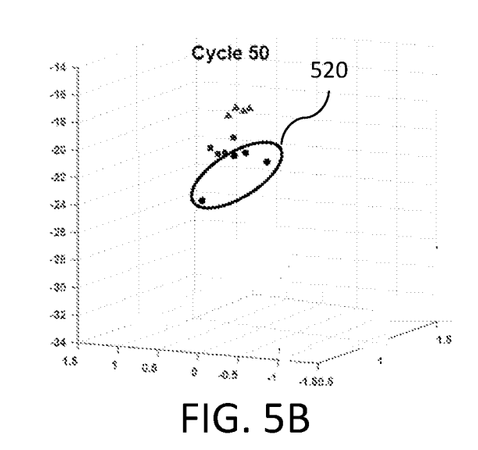

FIG. 5A represents the vehicle battery after just two cycles, for example during manufacturing or just after. However, the identified cluster 510 illustrates that cells 9, 10, 11, and 12 that had sliced separators are not performing as well as the other cells. In addition, two of the cells with the three-holes are also not performing at peak levels. At this point other actions may be taken, such as giving feedback to manufacturing that additional quality monitoring may be advisable. FIG. 5B represents the vehicle battery after 50 cycles. The previously identified sliced cells of cells 9, 10, 11, and 12 continue to degrade as shown by cluster 520.

Figure 5C:
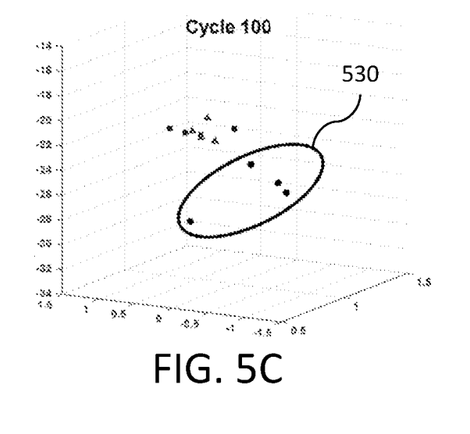
Figure 5D:
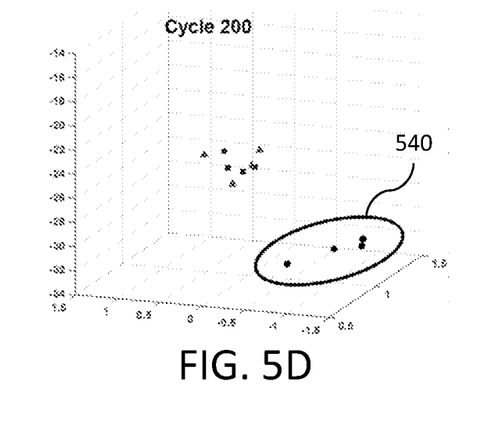

FIG. 5C represents the vehicle battery after 100 cycles and again indicates the severely compromised cells 9, 10, 11, and 12 in cluster 530. FIG. 5D again illustrates the continued degradation of cells 9, 10, 11, and 12 in cluster 540.

Figure 6:
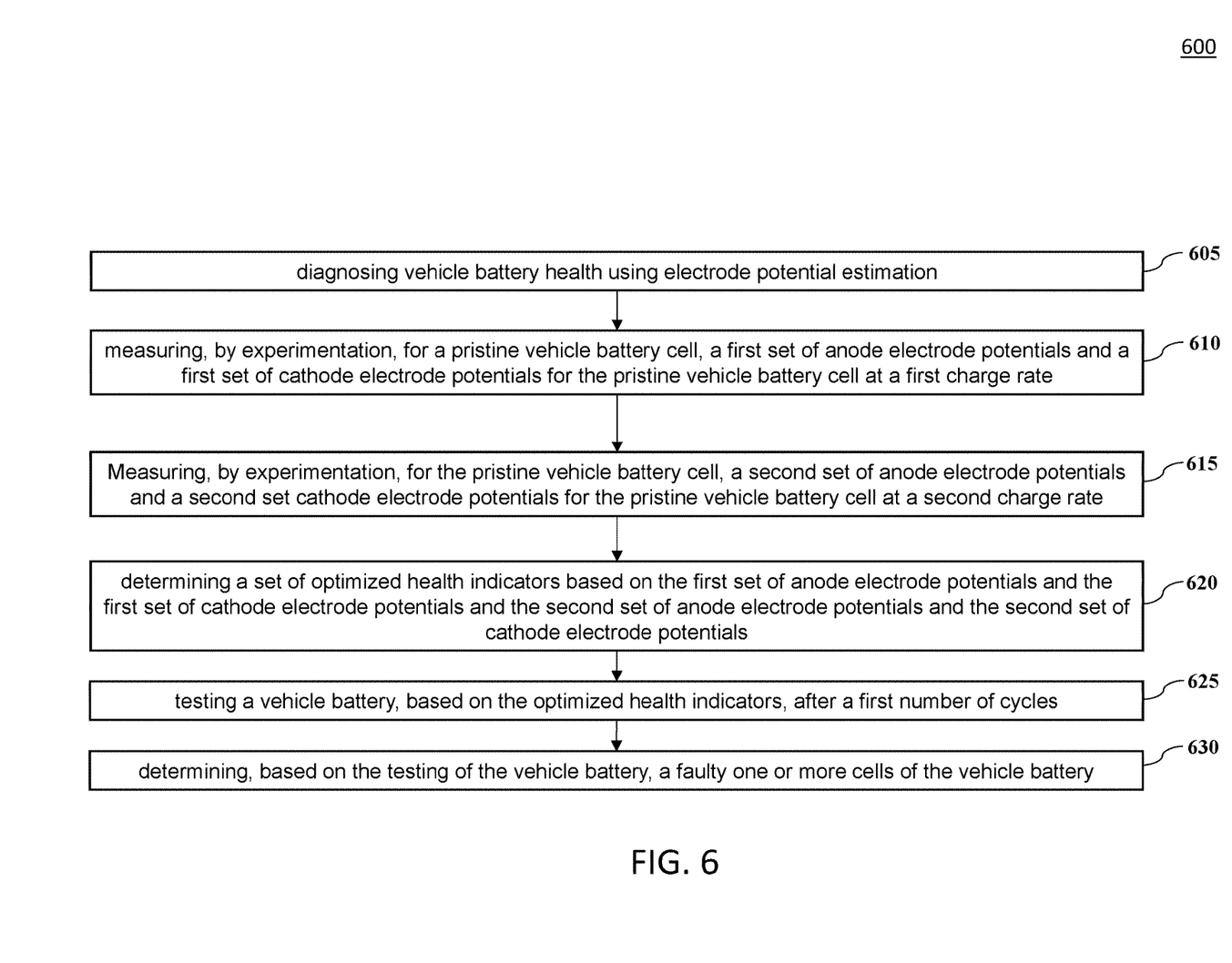
FIG. 6 is a method for diagnosing vehicle battery health using electrode potential estimation, in accordance with the disclosure.

FIG. 6 is a flowchart 600 that illustrates a method of diagnosing vehicle battery health using electrode potential estimation, according to an embodiment of the present disclosure.

Flowchart 600 may begin at step 605 with a defining of the method being diagnosing vehicle battery health using electrode potential estimation. At step 610, the method may perform a measurement, for a pristine vehicle battery cell, a first set of anode electrode potentials and a first set of cathode electrode potentials for the pristine vehicle battery cell at a first charge rate, e.g., an EP curve. As discussed, regarding FIG. 3A, the first set of anode electrode potentials and the first set of cathode electrode potentials for the pristine vehicle battery cell at a first charge rate may be represented by EP curve 300A, which may be derived by experimentation for pristine cells. In this example, EP curve 300A represents the curve for cells at a charge rate of C/100.

At step 615, the method may perform a measurement, for a pristine vehicle battery cell, a second set of anode electrode potentials and a second set of cathode electrode potentials for the pristine vehicle battery cell at a second charge rate may be represented by EP curve 300B, which may be derived by experimentation for pristine cells. In this example, EP curve 300B represents the curve for cells at a charge rate of C/5. In an embodiment, at least one of the discharge rates may be at a rate typical for an electric vehicle, which is in the 1C through C/5 range.

At step 620 the method continues by determining a set of optimized health indicators based on the first set of anode electrode potentials and the first set of cathode electrode potentials and the second set of anode electrode potentials and the second set of cathode electrode potentials. As discussed, regarding FIG. 3C, EP curve 300C may be determined by using as inputs the anode and cathode EP v. state of charge (SOC) curves at two different C-rates. In the example of EP curve 300A and EP curve 300B those rates were 5 and 100.

EP curve 300C may be derived from the health indicators labeled as θ={a, b, c, d, e, f} where $$Q/C_N = q_{an}(EP_{an}) = a * g_{an}^{\frac{C}{j}}(EP_{an}) + b * g_{an}^{\frac{C}{k}}(EP_{an}) + c$$

$$\text{and } Q/C_N = q_{ca}(EP_{ca}) = d * g_{ca}^{\frac{C}{j}}(EP_{ca}) + e * g_{ca}^{\frac{C}{k}}(EP_{ca}) + f,$$

where C-rates are defined as {j, k}, e.g., in this example j=5 and k=100. Further, the health indicators θ={a, b, c, d, e, f} may be estimated by voltage and current of a vehicle battery cell. This may be accomplished in two manners. The first approach may be to use cell voltage and current values {$V_k$, $I$} at constant current (CC) charging or discharging. The second approach may be to use an estimated open circuit voltage, $OCV_k$ and the associated current $I_k$ while discharging a cell.

In the case of constant current charging or discharging the optimization problem to derive θ may be expressed as $\min_\theta \in_k ([V_{k+1}-V_k]-[q_{ca}^{-1}(Q_{k+1}/C_N)-q_{ca}^{-1}(Q_k/C_N)]-[q_{an}^{-1}(Q_{k+1}/C_N)-q_{an}^{-1}(Q_k/C_N)]))$.

In the case of having estimated open circuit voltage, $OCV_k$ and the associated current $I_k$ while discharging a cell the optimization problem to derive θ may be expressed as $\min_\theta \Sigma_k([OCV_k-(q_{ca}^{-1}(Q_k)-q_{an}^{-1}(Q_k))]^2$, where $Q_k=Q_{k-1}+I_k*\Delta t$; $Q_0=SOC_0*C_N$ with $C_N$ representing the nominal capacity of the pristine vehicle battery cell.

At step 625, the method continues by testing a vehicle battery, based on the optimized health indicators, after a first number of cycles. As discussed in FIG. 5 shows the results of testing a vehicle battery after 2 cycles, 50 cycles, 100 cycles, and 100 cycles. At step 630 the method continues by determining, based on the testing of the vehicle battery, a faulty one or more cells of the vehicle battery. As shown in FIGS. 5A, 5B, 5C, and 5D, a set of cells was identified as being severely damaged. Further, as the number of cycles increased the damaged cells show a faster degradation versus the other cells.

Method 600 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method for diagnosing vehicle battery health using electrode potential estimation comprising:
   determining, for a pristine vehicle battery cell, a first set of anode electrode potentials and a first set of cathode electrode potentials for the pristine vehicle battery cell at a first charge rate (first C-rate);
   determining, for the pristine vehicle battery cell, a second set of anode electrode potentials and a second set of cathode electrode potentials for the pristine vehicle battery cell at a second charge rate (second C-rate);
   determining a set of optimized health indicators based on the first set of anode electrode potentials and the first set of cathode electrode potentials and the second set of anode electrode potentials and the second set of cathode electrode potentials;

testing a vehicle battery, based on the optimized health indicators, after a first number of cycles; and determining, based on the testing of the vehicle battery, a faulty one or more cells of the vehicle battery.

2. The method of claim 1, wherein the pristine vehicle battery cell comprises a lithium-ion type.

3. The method of claim 1, wherein the second charge rate (second C-rate) is greater than C/100, wherein C represents a capacity of a vehicle battery measured in amp hours.

4. The method of claim 1, further comprising identifying an appropriate range for the health indicators.

5. The method of claim 1, wherein the determining the set of optimized health indicators comprises measuring a plurality of cell voltages and a plurality of current values at a constant current charging or discharging of the pristine vehicle battery cell.

6. The method of claim 5, wherein determining the set of optimized health indicators is based on solving an optimization problem comprising:

$$\min_\theta \sum_k \left( [V_{k+1} - V_k] - \left( [q_{ca}^{-1}(Q_{k+1}/C_N) - q_{ca}^{-1}(Q_k/C_N)] - [q_{an}^{-1}(Q_{k+1}/C_N) - q_{an}^{-1}(Q_k/C_N)] \right) \right)^2,$$

where $Q_k = I*k*\Delta t$ and $\Delta t$ is a sampling period, $V_k$ and $V_{k+1}$ are voltages at time k and k+1, respectively, $C_N$ is the nominal capacity of the battery cell, $q_{ca}^{-1}$ and $q_{an}^{-1}$ are inverse functions of $q_{ca}$ and $q_{an}$, respectively, I is a current, $q_{ca} = Q/(C_N)(EP_{ca})$, $q_{an} = Q/(C_N)(EP_{an})$, $EP_{ca}$ is the electrode potential at the cathode, and $EP_{an}$ is the electrode potential at the anode.

7. The method of claim 5, wherein determining the set of optimized health indicators is based on:

$$Q/C_N = q_{an}(EP_{an}) = a * g_{an}^{\frac{C}{j}}(EP_{an}) + b * g_{an}^{\frac{C}{k}}(EP_{an}) + c$$

$$Q/C_N = q_{ca}(EP_{ca}) = d * g_{ca}^{\frac{C}{j}}(EP_{ca}) + e * g_{ca}^{\frac{C}{k}}(EP_{ca}) + f$$

where a, b, c, d, e, and f represent health indicator values, Q is the charge capacity of the battery cell, $C_N$ is the nominal capacity of the battery cell, $EP_{ca}$ is the electrode potential at the cathode, $EP_{an}$ is the electrode potential at the anode, $q_{ca} = Q/(C_N)(EP_{ca})$, $q_{an} = Q/(C_N)(EP_{an})$, $g_{an}^{c/j}$ and $g_{an}^{c/k}$ are the charge to anode potential functions at C-rates of c/j and c/k, respectively, and $g_{ca}^{c/j}$ and $g_{ca}^{c/k}$ are the charge to cathode potential functions at C-rates of c/j and c/k, respectively.

8. The method of claim 1, wherein the determining the set of optimized health indicators comprises measuring a plurality of cell open circuit voltages (OCV) and a plurality of current values at a constant rate of discharging of the pristine vehicle battery cell.

9. The method of claim 7, wherein determining the set of optimized health indicators is based on solving an optimization problem comprising:

$$\min_\theta \sum_k \left( [OCV_k - (q_{ca}^{-1}(Q_k/C_N) - q_{an}^{-1}(Q_k/C_N))] \right)^2,$$

where $Q_k = Q_{k-1} + I_k * \Delta t$; $Q_0 = SOC_0 * C_N$ with $C_N$ representing the nominal capacity of the pristine vehicle battery cell, where $OCV_k$ is an estimated open circuit voltage, $q_{ca}^{-1}$ and $q_{an}^{-1}$ are inverse functions of $q_{ca}$ and $q_{an}$, respectively, $q_{ca} = Q/(C_N)(EP_{ca})$, $q_{an} = Q/(C_N)(EP_{an})$, $I_k$ is a current associated with $OCV_k$, $\Delta t$ is a sampling period, and $SOC_0$ is a state of charge of the battery cell at a time k=0.

10. A system for diagnosing vehicle battery health using electrode potential estimation comprising:

a computer, configured to determine, for a pristine vehicle battery cell, a first set of anode electrode potentials and a first set of cathode electrode potentials for the pristine vehicle battery cell at a first charge rate (first C-rate);

the computer, configured to determine, for the pristine vehicle battery cell, a second set of anode electrode potentials and a second set of cathode electrode potentials for the pristine vehicle battery cell at a second charge rate (second C-rate);

the computer, configured to determine a set of optimized health indicators based on the first set of anode electrode potentials and the first set of cathode electrode potentials and the second set of anode electrode potentials and the second set of cathode electrode potentials;

a battery testing system configured to test a vehicle battery after a first number of cycles based on the optimized health indicators; and the battery testing system configured to determine, based on the testing of the vehicle battery, a faulty one or more cells of the vehicle battery.

11. The system of claim 10, wherein the pristine vehicle battery cell comprises a lithium-ion type.

12. The system of claim 10, wherein the second charge rate (second C-rate) is greater than C/100, wherein C represents a capacity of a vehicle battery measured in amp hours.

13. The system of claim 10, further comprising the computer configured to identify an appropriate range for the health indicators.

14. The system of claim 10, further comprising the computer configured to determine the set of optimized health indicators comprising measuring a plurality of cell voltages and a plurality of current values at a constant current charging of the pristine vehicle battery cell.

15. The system of claim 14, further comprising the computer configured to determine the set of optimized health indicators based on solving an optimization problem comprising:

$$\min_\theta \sum_k \left( [V_{k+1} - V_k] - \left( [q_{ca}^{-1}(Q_{k+1}/C_N) - q_{ca}^{-1}(Q_k/C_N)] - [q_{an}^{-1}(Q_{k+1}/C_N) - q_{an}^{-1}(Q_k/C_N)] \right) \right)^2,$$

where $Q_k = I*k*\Delta t$ and $\Delta t$ is a sampling period, $V_k$ and $V_{k+1}$ are voltages at time k and k+1, respectively, $C_N$ is the nominal capacity of the battery cell, gland $q_{ca}^{-1}$ and $q_{an}^{-1}$ are inverse functions of $q_{ca}$ and $q_{an}$, respectively, I is a current, $q_{ca} = Q/(C_N)(EP_{ca})$, $q_{an} = Q/(C_N)(EP_{an})$, $EP_{ca}$ is the electrode potential at the cathode, and $EP_{an}$ is the electrode potential at the anode.

16. The system of claim 14, further comprising the computer configured to determine the set of optimized health indicators based on:

$$Q/C_N = q_{an}(EP_{an}) = a*g_{an}^{\frac{C}{j}}(EP_{an}) + b*g_{an}^{\frac{C}{k}}(EP_{an}) + c$$

$$Q/C_N = q_{ca}(EP_{ca}) = d*g_{ca}^{\frac{C}{j}}(EP_{ca}) + e*g_{ca}^{\frac{C}{k}}(EP_{ca}) + f$$

where a, b, c, d, e, and f represent health indicator values, $C_N$ is the nominal capacity of the battery cell, $EP_{ca}$ is the electrode potential at the cathode, $EP_{an}$ is the electrode potential at the anode, $q_{ca}=Q/(C_N)(EP_{ca})$, $q_{an}=Q/(C_N)(EP_{an})$, $g_{an}^{c/j}$ and $g_{an}^{c/k}$ are the charge to anode potential functions at C-rates of c/j and c/k, respectively, and $g_{ca}^{c/j}$ and $g_{ca}^{c/k}$ are the charge to cathode potential functions at C-rates of c/j and c/k, respectively.

17. The system of claim 10, further comprising the computer configured to determine the set of optimized health indicators comprises measuring a plurality of cell open circuit voltages (OCV) and a plurality of current values at a constant rate of discharging of the pristine vehicle battery cell.

18. The system of claim 16, wherein determining the set of optimized health indicators is based on solving an optimization problem comprising:

$$\min_\theta \sum_k \left( [OCV_k - (q_{ca}^{-1}(Q_k/C_N) - q_{an}^{-1}(Q_k/C_N))] \right)^2,$$

where $Q_k = Q_{k-1} + I_k * \Delta t$; $Q_0 = SOC_0 * C_N$ with $C_N$ representing the nominal capacity of the pristine vehicle battery cell, where $OCV_k$ is an estimated open circuit voltage at a time k, $q_{ca}^{-1}$ and $q_{an}^{-1}$ are inverse functions of $q_{ca}$ and $q_{an}$, respectively, $q_{ca}=Q/(C_N)(EP_{ca})$, $q_{an}=Q/(C_N)(EP_{an})$, $I_k$ is a current associated with $OCV_k$, $\Delta t$ is a sampling period, and $SOC_0$ is a state of charge of the battery cell at a time k=0.

19. A method for diagnosing vehicle battery health using electrode potential estimation comprising:
    determining, for a pristine lithium-ion vehicle battery cell, a first set of anode electrode potentials and a first set of cathode electrode potentials for the pristine lithium-ion vehicle battery cell at a first charge rate (first C-rate);
    determining, for the pristine lithium-ion vehicle battery cell, a second set of anode electrode potentials and a second set of cathode electrode potentials for the pristine lithium-ion vehicle battery cell at a second charge rate, wherein the second charge rate (second C-rate) is greater than C/100, wherein C represents a capacity of a vehicle battery measured in amp hours;
    determining a set of optimized health indicators based on the first set of anode electrode potentials and the first set of cathode electrode potentials and the second set of anode electrode potentials and the second set of cathode electrode potentials;
    identifying an appropriate range for the health indicators testing a vehicle battery, based on the optimized health indicators, after a first number of cycles; and
    determining, based on the testing of the vehicle battery, a faulty one or more cells of the vehicle battery.

20. The method of claim 19, wherein the determining the set of optimized health indicators comprises measuring a plurality of cell voltages and a plurality of current values at a constant current charging or discharging of the pristine lithium-ion vehicle battery cell.

* * * * *